US012754735B2

(12) United States Patent
Schneider et al.

(10) Patent No.: US 12,754,735 B2
(45) Date of Patent: Oct. 6, 2026

(54) AUTOMATED CROSS PORTS FROM PUBLIC CLOUD TO PRIVATE CLOUD

(71) Applicant: SAP SE, Walldorf (DE)

(72) Inventors: Matthias Schneider, Munich (DE); Riswan Lathif, Munich (DE)

(73) Assignee: SAP SE, Walldorf (DE)

( * ) Notice: Subject to any disclaimer, the term of this patent is extended or adjusted under 35 U.S.C. 154(b) by 238 days.

(21) Appl. No.: 18/793,622

(22) Filed: Aug. 2, 2024

(65) Prior Publication Data

US 2026/0037257 A1 Feb. 5, 2026

(51) Int. Cl.

| | |
|---|---|
| ***G06F 9/44*** | (2018.01) |
| ***G06F 8/65*** | (2018.01) |
| ***G06F 8/76*** | (2018.01) |
| ***G06F 11/3604*** | (2025.01) |

(52) U.S. Cl.

CPC .................. *G06F 8/76* (2013.01); *G06F 8/65* (2013.01); *G06F 11/3616* (2013.01)

(58) Field of Classification Search

CPC ........... G06F 8/76; G06F 8/65; G06F 11/3616

See application file for complete search history.

(56) References Cited

U.S. PATENT DOCUMENTS 11,481,200 B1 * 10/2022 Huang ...................... G06F 8/76

2025/0173162 A1 * 5/2025 Mystetskyi ............... G06F 8/71

* cited by examiner

*Primary Examiner* — Qamrun Nahar

(74) *Attorney, Agent, or Firm* — Mintz Levin Cohn Ferris Glovsky and Popeo, P.C.

(57) ABSTRACT

In some implementations, there may be provided a method that includes analyzing, by the cross port assistant, upgrade code for the selected corrective measure to determine an extent of the upgrade code; comparing, by the cross port assistant, a first code for the first application and a second code for a second application that is hosted on a second cloud platform and that is a target of the upgrade code to determine a degree of similarity; and in response to the degree of similarity being within a threshold amount, the method further comprises: porting the upgrade code to the second application hosted on the second cloud platform, triggering additional testing of the first application and the second application, and allowing the upgrade code at the second application to be released for productive use at the second cloud platform. Related systems, methods, and articles of manufacture are also disclosed.

20 Claims, 5 Drawing Sheets

AUTOMATED CROSS PORTS FROM PUBLIC CLOUD TO PRIVATE CLOUD

TECHNICAL FIELD

The present disclosure generally relates to porting in a cloud computing environment.

BACKGROUND

In a cloud computing environment, multiple tenants can be served by a shared pool of computing resources including, for example, computer networks, servers, storage, applications, and/or the like. A tenant can be any entity that requires a secure and exclusive computing environment implemented using at least a portion of the shared pool of computing resources. As such, the multi-tenant cloud computing environment may isolate identity and access management across different tenants as well as segregate tenant-specific data and resources.

SUMMARY

In some implementations, the current subject matter relates to a computer implemented method. The method may include searching, by a cross port assistant, a repository to identify one or more corrective measures for a first application hosted on a first cloud platform; receiving, by the cross port assistant, a listing of the one or more corrective measures that have been implemented for the first application hosted on the first cloud platform; receiving, by the cross port assistant, an indication of a selection of a corrective measure from the listing of the one or more corrective measures that have been implemented for the first application hosted on the first cloud platform; analyzing, by the cross port assistant, upgrade code for the selected corrective measure to determine an extent of the upgrade code; comparing, by the cross port assistant, a first code for the first application and a second code for a second application that is hosted on a second cloud platform and that is a target of the upgrade code to determine a degree of similarity; and in response to the degree of similarity being within a threshold amount, the method further comprises: porting the upgrade code to the second application hosted on the second cloud platform, triggering additional testing of the first application and the second application, and allowing the upgrade code at the second application to be released for productive use at the second cloud platform.

In some implementations, the current subject matter includes one or more of the following optional features. The searching may further include the cross port assistant searching a plurality of repositories based on an identifier of the first application for the one or more corrective measures. The first cloud platform may include a public cloud, and wherein the second cloud platform may include a private cloud platform. The listing may be received from the repository. The indication of the selected corrective measure nay be received from a user interface at a client device. The receiving the indication of the selected corrective measure may further include opening the selected corrective measure to reveal one or more coding changes. The analyzing may further include analyzing the upgrade code to determine an extent of change. An alert message may be triggered, in response to the degree of similarity not being within the threshold amount, triggering an alert message.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

An application can be deployed using a public cloud for a given set of tenants, but the application may also be deployed to a private cloud system for another set of tenants. The software developer of the application may develop code, such as "upgrade code" to for example provide a new feature to the application, fix a bug, etc. As used herein, upgrade code refers to data, such as code, used to change, such as create, modify, delete, update, and/or the like, a feature or an aspect of an application. The upgrade code may provide data, such as code (also referred to as program code), a file, metadata, etc., that can provide a bugfix to the application, add a feature to the application, modify a feature of the application, make other changes (e.g., cosmetic changes to a user interface (UI), and/or the like.

Moreover, the software developer may prioritize development and deployment of the upgrade code so that the upgrade code is first developed for deployment to the public cloud. If needed, the upgrade code may be ported (e.g., converted) to run on the hardware, operating system, and the like of the private cloud. Alternatively, the software developer may prioritize the upgrade code, so that it is first developed for deployment to the private cloud and later (if needed) ported to the private cloud. In either case, there is a need to automate the porting process between a first cloud system and a second cloud system.

To illustrate further, an application developed for a public cloud may include a first feature, such as a conversion from imperial units to metric, a UI feature, and/or any other feature. In this example, the upgrade code for the first feature of the application is developed, tested, and deployed for use on the resources (e.g., hardware, software including operating system (e.g., hypervisor operating system, etc.) of the public cloud system. However, this upgrade code has not been developed, tested, or deployed for use on application hosted on the resources of a private cloud system, in which case the upgrade code should be ported so it can be used on the application hosted on the private cloud (as the private cloud may have different resources with respect to hardware, operating systems, hypervisor operating systems, and/or the like, when compared to the public cloud's resources). Moreover, there can be dozens if not hundreds or thousands of features that might be considered for porting from a public cloud hosting to a private cloud hosting. To that end, there is provided an automated process for porting code, such as upgrade code, from a first cloud platform to a second cloud platform, in accordance with some embodiments.

Figure 1:
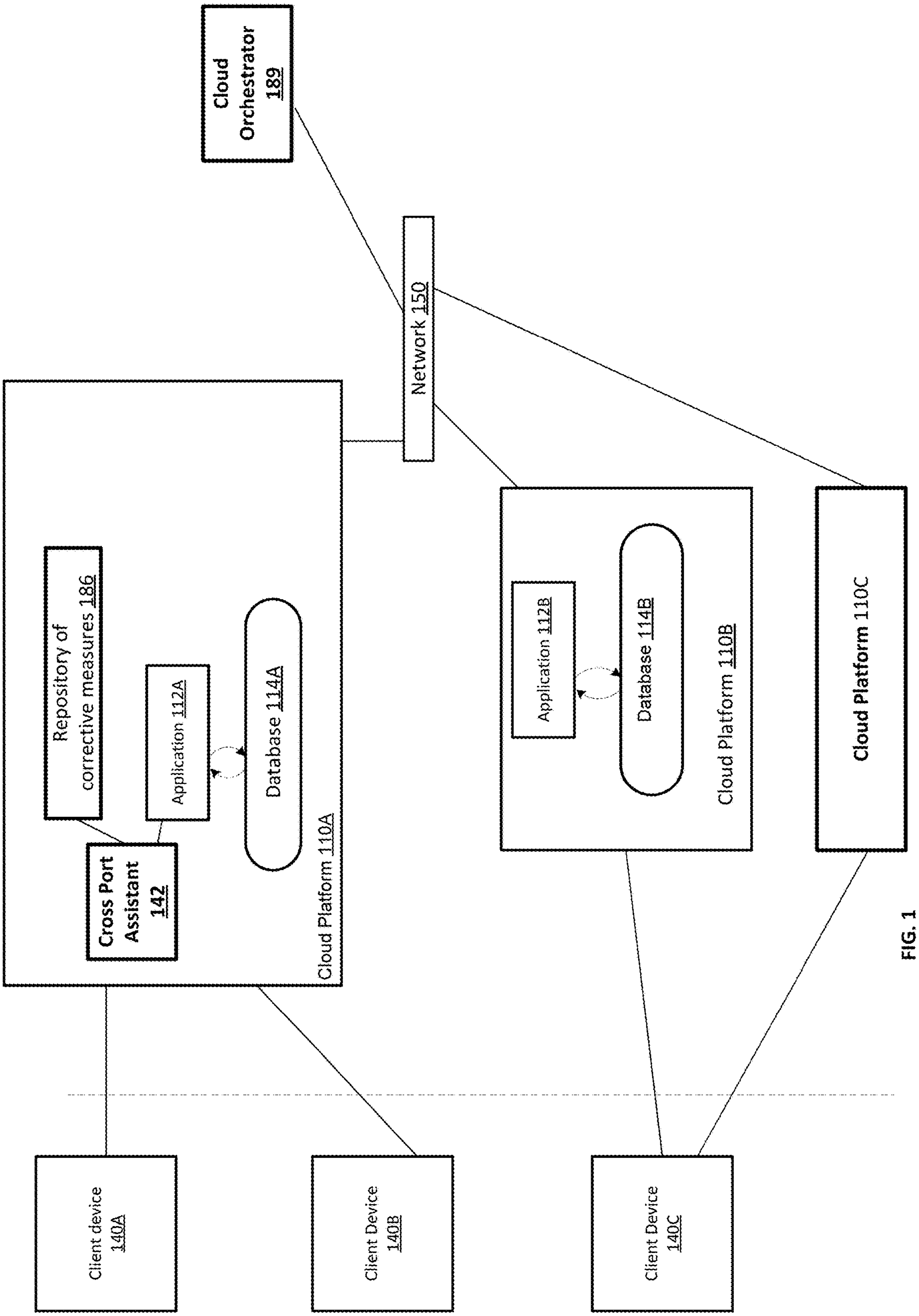
FIG. 1 illustrates an example of a cloud platform, in accordance with some example implementations of the current subject matter.

FIG. 1 depicts an example of a system 100 for automatic cross porting, in accordance with some embodiments. The system 100 may include a cross port assistant 142 configured to automatically port code from a first cloud system to a second cloud system. Although FIG. 1 depicts the cross port assistant (CPA) 142 at a cloud platform 110A, the cross port assistant (CPA) may be located at other devices. For example, the CPA 142 may be hosted at another cloud platform, such as cloud platform 110B or 110C or at client device. Moreover, although FIG. 1 depicts a single CPA, the system 100 may include a plurality of CPAs as well configured to automate the porting of the upgrade code. Alternatively, or additionally, the CPA 142 may be included in a cloud orchestrator 189. The cloud orchestrator automates tasks associated with operations on the cloud platforms (e.g., provisioning resources, monitoring resources, etc.)

Referring to FIG. 1, the system 100 may include a plurality of cloud platforms (also referred to as cloud systems), such as a cloud platform 110A, a cloud platform 110B, 110C, and/or the like. Although FIG. 1 depicts to three cloud platforms, other quantities of cloud platform may be implemented in the system 100 as well. Moreover, the cloud platform 110A may comprise for example a private cloud, while the cloud platform 110B may comprise for example a public cloud (or vice versa). The cloud platforms 110A-B may provide resources that can be shared among a plurality of tenants. For example, the cloud platform may be configured to provide a variety of services including, for example, software-as-a-service (SaaS), platform-as-a-service (PaaS), infrastructure as a service (IaaS), and/or the like, and these services can be accessed by one or more tenants of a cloud platform. For example, the cloud platform may provide SaaS, such as one or more applications (e.g., services, microservices, and the like).

In the example of FIG. 1, the system 100 includes a first client device 140A (which may be accessed by a first tenant), a second client device 140B (which may be accessed by a second tenant or the same tenant), and a third client device 140C, although other quantities of tenants may be implemented as well. For example, multitenancy enables multiple end-user client devices (e.g., a computer-based device including an application) to access a given cloud platform having resources shared via a network 150 (e.g., the Internet, communication link(s), at least one bus, and/or other type of network or communication mechanism).

The cloud platforms 110A-C may include resources, such as at least one computer (e.g., a server), data storage, and a network (including network equipment) that couples host computer(s) and storage. The cloud platform may also include other resources, such as operating systems, hypervisors, and/or other resources, to virtualize physical resources (e.g., via virtual machines), provide deployment (e.g., via containers) of applications (which provide services, for example, on the cloud platform) and other resources).

In the case of a "public" cloud platform, the applications (also referred to as services, microservices, etc.) may be provided on-demand to a client device, such as a tenant, via the Internet. For example, the resources at the public cloud platform may be operated and/or owned by a cloud service provider (e.g., Amazon Web Services, Azure, SAP public cloud, etc.), such that the physical resources at the cloud service provider can be shared by a plurality of tenants. For example, in a public cloud, resources may be shared by a first set of tenants associated with a first entity, such as Company A, and the resources of the public cloud may be shared by a second set of tenants associated with a second entity, such as company B.

Alternatively, or additionally, the cloud platform may be a "private" cloud platform, in which case the resources of the cloud platform are dedicated to a single entity. Referring to the previous example, in a private cloud, resources are dedicated to the first set of tenants associated with the first entity, such as Company A. The private cloud resources may be physically located within the first entity (e.g., "on premise"), although the dedicated resources may offsite as well (e.g., dedicated resources at a cloud provider, such as Amazon Web Services, etc.). Private clouds are also referred to as internal clouds or corporate clouds.

Alternatively, or additionally, the cloud platform may be considered a "hybrid" cloud platform, which includes a combination of "private" resources as well as "public" resources. For example, a hybrid cloud service may include web servers running in a public cloud while application servers and/or databases are hosted privately (e.g., at an area controlled or operated by the entity, such as a corporate entity).

In the example of FIG. 1, the cloud platform 110A provides at least one application, such as an application 112A, to one or more tenants at client devices 140A-B, for example. The application 112A may be deployed via a container, which provides a package or bundle of software, files, libraries, configuration data, and/or the like to enable the cloud platform 110A to deploy during runtime the application 112A to, for example, one or more virtual machines (which are at the cloud platform 110A) that provide the application 112A to for example the one or more tenants at the client device 140A, client device 140B, etc. In the example of FIG. 1, the application 112A is deployed during runtime to provide a database management system for a database 114A, for example, although other types of application may be deployed.

Moreover, the cloud platform 110B provides at least one application, such as an application 112B, to one or more tenants at client device 140C, for example. Likewise, the application 112B is deployed during runtime to provide a database management system for a database 114B to at least client device 140C (which also has access to cloud platform 110C). In this example, the applications 112A and 112B may be considered similar in some respects such as both provide the functionality of a database management system for a corresponding database. But the applications 112A and 112B may differ in that the first application is developed and deployed for the resources (e.g., hardware, software, etc.) of a first cloud platform 110A (which in this example is a public cloud) and the second application is developed and deployed for the resources of a second cloud platform 110B (which in this example is a private cloud). As such, there may (or may not) be aspects of the code of the applications 112A and 112B that are different, in which case porting is needed to convert any differences.

Figure 2A:
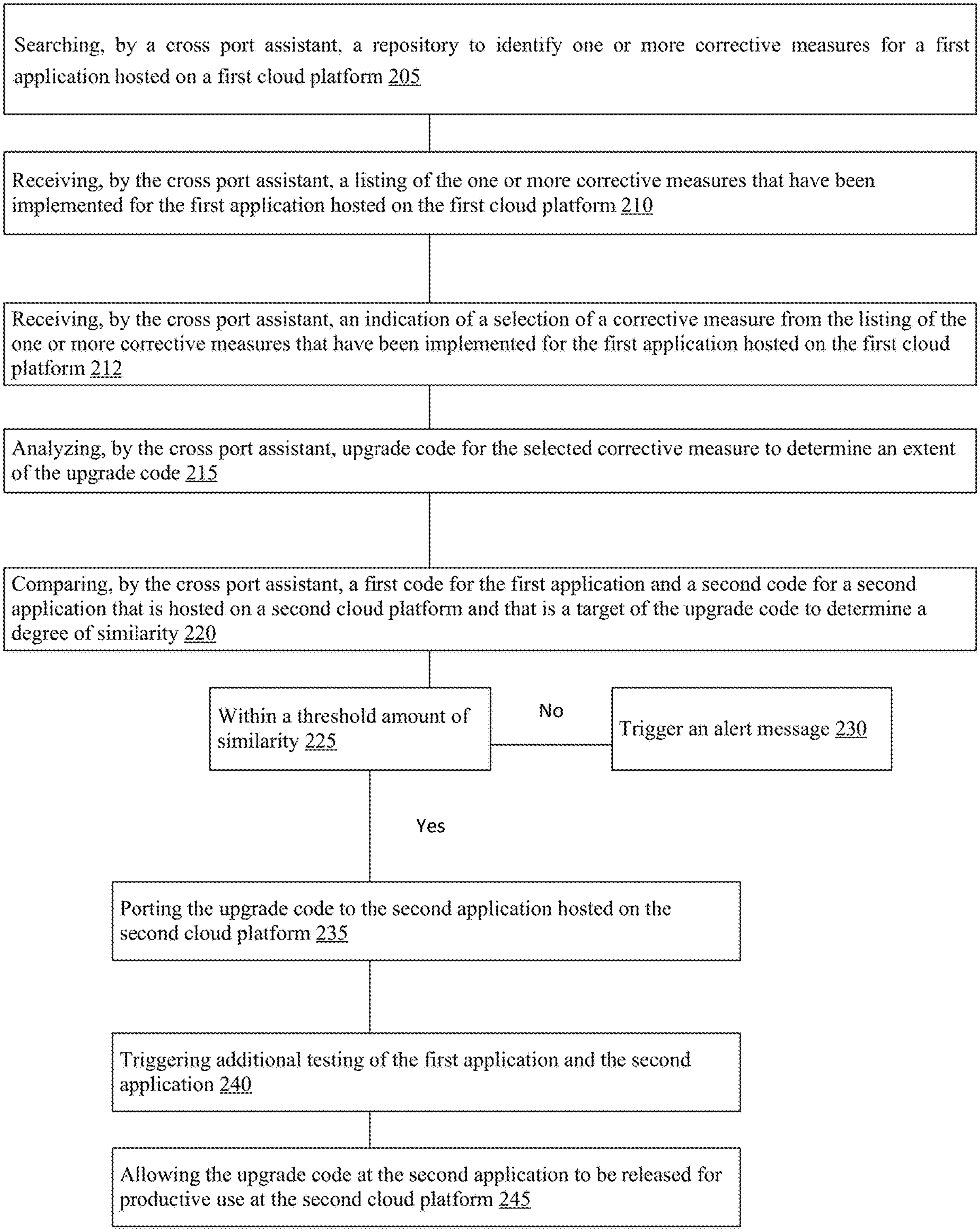
FIG. 2A illustrates an example of a process for automating porting between cloud platforms, in accordance with some example implementations of the current subject matter.

FIG. 2A depicts an example process for porting code (e.g., upgrade code) from a first cloud platform to a second cloud platform, such as between cloud platforms 110A and 110B. For example, the process of FIG. 2A may be used to automate the process of porting code from a first public cloud platform and a second private cloud platform (or, for example, from a private cloud to a public cloud). Moreover, the process may assist in determining whether a given feature that can be ported should be ported (e.g., whether the porting of the upgrade code for a feature to the new cloud platform is likely to involve significant conversion effort, testing, etc.). The description of FIG. 2A also refers to FIG. 1.

At 205, the CPA 142 may search a repository 186 of corrective measures (CMs) to identify one or more corrective measures for a first application hosted on a first cloud platform. The corrective measures may represent upgrades, such as code upgrades (e.g., coding changes for a bugfix or new feature) that have been implemented at the cloud platform 110A for application 112A, which in this example is a public cloud. The CPA may search the repository (or a plurality of repositories) 186 based on the identity of the first application 112A. When this is the case, the search of the repository may return a listing of the corrective measures that have been implemented at the application 112A and are candidates for porting to the second cloud platform 110B, such as a private cloud. As noted, the listing may include CMs for one or more bugfixes and/or one or more new features.

At 210, the CPA 142 may receive a listing of the corrective measures that have been implemented for the first application hosted on a first cloud platform 210. For example, the repository or search may return a listing of one or more corrective measures (CMs) that have been implemented at the first application 112A and this listing represents possible candidates for porting to the second application 112B at the second cloud platform 110B. Moreover, the listing of CMs may include (e.g., link to, identify, etc.) where the code upgrade is used in the first application 112A; the actual code for the code upgrade; context information (e.g., information indicating the type or nature of the code upgrade, such as whether the code upgrade a bugfix or new feature, what the upgrade code does (e.g., changes a variable or some other indication of what is changed)); the extent of the change (e.g., lines of the upgrade code); and/or the like. To illustrate further, the listing of CMs may be provided (e.g., sent from the repository 186) to the CPA and/or provided to the client device 140 for example to display to a user.

At 212, the CPA 142 may receive an indication of a selection of a corrective measure from the listing of the corrective measures that have been implemented for the first application 112A hosted on the first cloud platform 212. For example, the CMs obtained from the repository 186 may comprise a listing of CMs. At least one CM may be selected from the list by the CPA 142 and/or a client device 140A (e.g., a user of the client device may select one of the CMs listed and displayed at the client device) for porting. In either case, the selection of the CM is received by the CPA 142. To illustrate further, when a CM is selected, the CM may be "opened" to reveal the coding changes for the software (e.g., the upgrade code) used at the application 112A that is a candidate for porting to the first cloud platform 110A.

At 215, the CPA 142 may analyze the selected CM and, in particular, the upgrade code, for the selected CM to determine an extent of the upgrade code. For example, when the CM is selected, the CM may map to the actual upgrade code (e.g., the code for the changes to the application 112A developed for the resources at the cloud platform 110A). The upgrade code may then be analyzed to determine the extent of the change. For example, the upgrade code (which in this example has already been developed and deployed to the application 112A and logged to the repository 186) may be analyzed to determine the extent. The extent refers to one or more of the following: size (e.g., code lines) of the upgrade code; whether the upgrade code is a bug fix; whether the upgrade code adds a new feature; whether the upgrade code deletes a feature; whether the upgrade code modifies a feature; what parts of the system 100 are affected by the upgrade code (e.g., front end, such as a user interface (UI) at the client device 140A, backend, such as the database 114, etc.), whether the upgrade code adds a method, a class, and/or an.

Figure 2B:
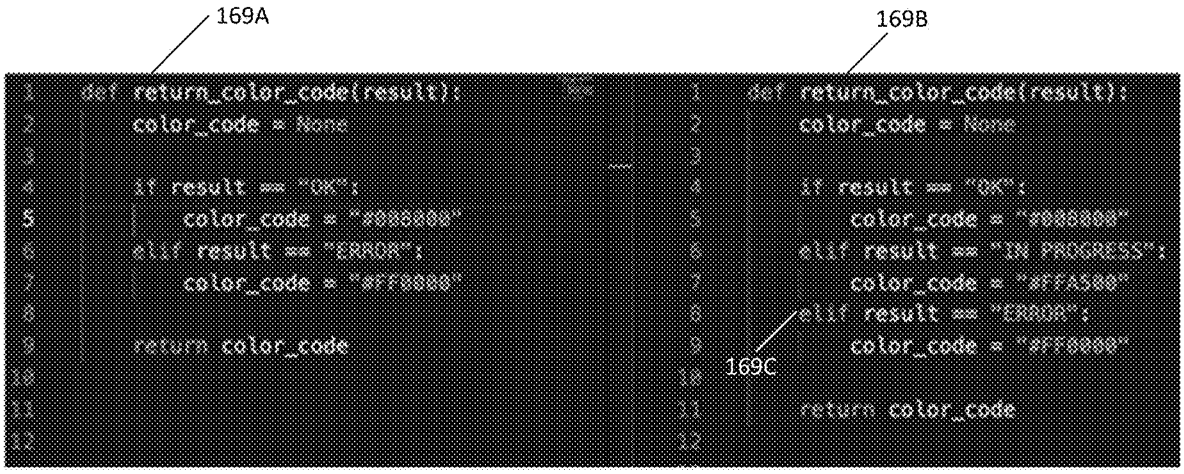
FIG. 2B depicts an example of code and upgrade code, in accordance with some embodiments.

At 220, the CPA 142 may compare a first code for the first application and a second code for a second application that is hosted on a second cloud platform and that is a target of the upgrade code to determine a degree of similarity. For example, the code for application 112A and the code for application may be identical (e.g., same application ID, same version, same release etc.), in which case there is a high degree of similarity so there is little, if any, difference between the two (e.g., within a threshold amount of code similarity). Alternatively, or additionally, some of the code for application 112A and application 112B may be somewhat similar (e.g., within a threshold amount of code similarity). Alternatively, or additionally, some of the code for application 112A and application 112B may be very dissimilar (e.g., above a threshold amount of code line similarity). FIG. 2B depicts an example of a first application 169A and a second application 169B, wherein an additional statement "elif" 169C is added to the second application 169B. For example, a cosine similarity metric may be used to compare the code strings of the first application 169A and the code string of the second application 169B. In this example, the first and second applications may be within a threshold degree of similarity. Alternatively, or additionally, the degree of similarity may be based at least in part on context information for the applications (e.g., application ID, version ID, release ID, etc.).

If the differences between the first code for the first application 112A and the second code the second application 112B is not within a threshold amount of similarity (no at 225), the CPA 142 may trigger at 230 an alert message to indicate the first code for application 112A and the second code for the second application 112B are not similar (i.e., very different). For example, the CPA 142 may trigger the alert message to a client device, such as client device 140A. To illustrate further, a similarity metric may be determined (which compares the first code and the second code). The similarity metric, such as a cosine similarity metric, between the first and second code (or other type of similarity metric) may indicate the degree of similarity (or degree of difference between the two). In the case or a cosine similarity, the cosine similarity between the first code and the second code indicates the degree of similarity between the lines of code of the first code and the lines of code of the second code. For example, if the first and second codes are within a threshold amount (e.g., distance in vector space), the first and second codes may be the same or similar; but if the first and second codes exceed the threshold amount, the first and second codes may be very dissimilar (which implies a more resource intensive porting).

If the differences between the first code for the first application 112A and the second code the second application 112B is within a threshold amount of similarity (yes at 225), the CPA 142 may trigger a message to a client device, such as client device 140A (where it can be displayed at a UI), to propose cross porting of the upgrade code from the first application 112A for use at the second application 112B. If the proposal is accepted in response to the message for example, the upgrade code is ported, at 235, to the second application 112B. For example, the upgrade code may be converted for use at the second application (for example, using a GIT merge of the code).

After the cross porting, the CPA 142 may trigger, at 240, additional testing of the first application 112A and the second application 112B. For example, after the upgrade code is deployed to the second application, the CPA may trigger testing of each of the applications 112A-B. In some implementation, testing may be performed before and after the upgrade is installed at application 112B.

If the testing at 240 passes, the CPA 142 may allow, at 245, that the upgrade code (which was ported) be released for production at the second application at the second cloud. For example, the ported upgrade code may be incorporated into a patch or a new release of the code for the second application 112B at the second cloud platform 110B. The patch or new release may be sent as a container to the second cloud platform 110B, which is then executed to provide the application 112B with the incorporation of the upgraded code.

Referring again to 215, the analysis may include determining to what extent the code at the first application 112A and the code at the second application 112B differ (or are similar). If the code similarity is not within a threshold amount of similarity, the code is different so the CPA may, as noted, notify a user device or user. Moreover, the specific objects (in which the new coding should be integrated) may be screened to see to what extent the coding differs. For example, a diff tool (e.g., version control framework such as GIT) may be used determine the differences between commits and coding.

Referring again to 235, if the first and second code lines are within a threshold amount of similarity, a message may be sent to a user (e.g., at a client device 140A) proposing incorporating the code changes (which were made in the first application of the first cloud platform public cloud) into the second application at the second cloud platform. In this example, when the user accepts the proposal, one or more automated tests, such as unit tests, end-2-end tests, and/or integration tests, may be performed for both, the private cloud code line with and without the upgrade coding. When testing is complete, the new coding (e.g., the upgrade code for the second application) may be transported to the second application at the second cloud platform. To that end, a correction request (CR) is created to transport the new code to the second cloud platform in the related CM. The corrective measure (CM) may contain or identify a correction request that contains the coding changes. Alternatively, or additionally, additional testing of the second application 112B at the second cloud platform may be performed as well.

Moreover, a list of past customer or internal incidents may be search for related issue with for example upgrade code. This can be done using keywords and terms attached to the CM. In case there are related incidents, they can be added to the corresponding CM under the references section by adding their ID. By searching similar incidents that have been solved in the past (together with their solutions), the system may provide metadata or help that provides additional details with respect to a current issue.

As noted, the first application 112A may have implemented certain code (e.g., "upgrade code") that represents a bugfix. When this is the case, the second application 112B may be tested to determine if the "bugfix" is an issue at the second application 112B. The testing may include unit test including user interface related testing (e.g., rendering, backend return calls, UI functional tests), API testing, integration testing, and/or the like to find and test the affected control coding that is involved in the bugfix. For example, this testing may occur during an initial step to check if the corresponding bug occurs in the related private cloud code or on-premise code. This control coding may be found in the code by searching for the control code's ID. Alternatively, or additionally, code documentation, such as a note attached to a corrective measure (CM) may include the correction code used to fix the bug on public cloud platform. From this note, the system may obtain a description and a solution of the error (which is associated with the bugfix) and may create an automated test to check if the error also exists in the private cloud version of the application.

In some embodiments, a machine learning model may be used. For example, a ML model may go through the coding of other, similar applications (or transactions) and find similar unit tests that can be used as baseline test for the current issue. For example, a generative AI model (e.g., Chat GPT-4 or the like) may assist with creating required automated tests for the corresponding programming language. The generated automated test may then check the objects (or functions) that are associated with the related control code of the application. In case of unit tests for example, the ML model may search for control code that are related to related units, such as methods or functions. In case of integration tests and end-2-end tests, the test may first check if that control code exists in the associated view. Next, the integration test may perform the corresponding action that the control provides (e.g., clicking on a button, etc.) Next, the system may assess whether the control shows the desired behavior in that private cloud release.

Figure 3:
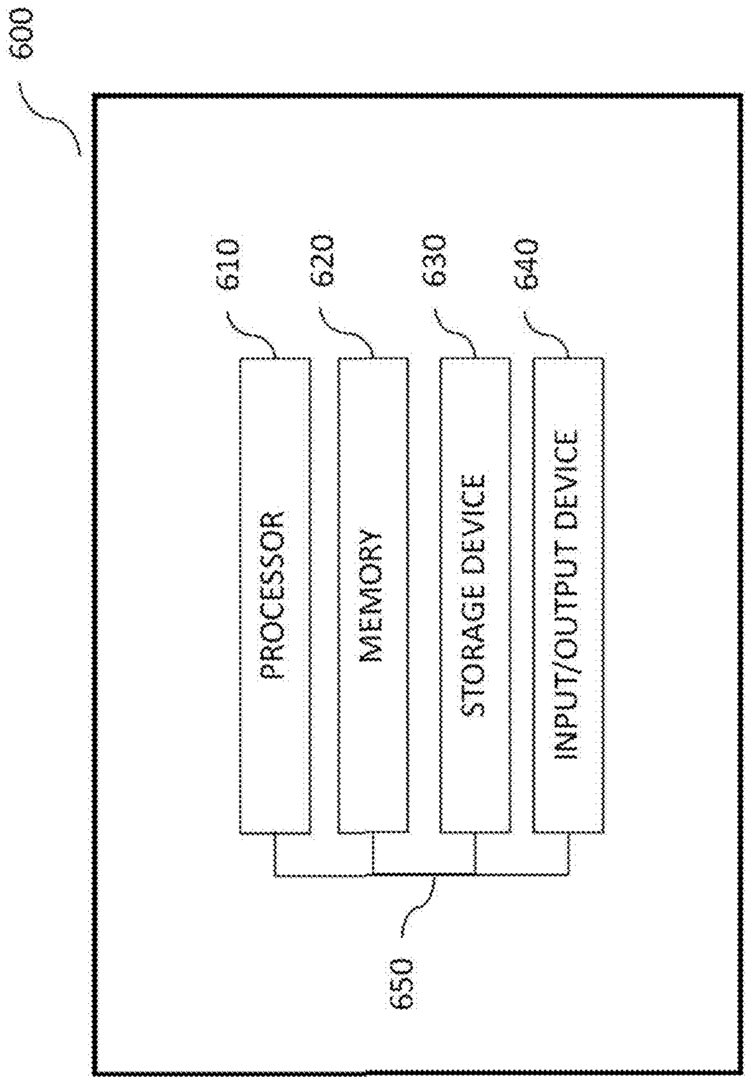
FIG. 3 depicts an example of a system operative, in accordance with some example implementations of the current subject matter.

In some implementations, the current subject matter may be configured to be implemented in a system 600, as shown in FIG. 3. For example, the CPA and other components of the system 100 may be implemented using the system 600. The system 600 may include a processor 610, a memory 620, a storage device 630, and an input/output device 640. Each of the components 610, 620, 630 and 640 may be interconnected using a system bus 650. The processor 610 may be configured to process instructions for execution within the system 600. In some implementations, the processor 610 may be a single-threaded processor. In alternate implementations, the processor 610 may be a multi-threaded processor. The processor 610 may be further configured to process instructions stored in the memory 620 or on the storage device 630, including receiving or sending information through the input/output device 640. The memory 620 may store information within the system 600. In some implementations, the memory 620 may be a computer-readable medium. In alternate implementations, the memory 620 may be a volatile memory unit. In yet some implementations, the memory 620 may be a non-volatile memory unit. The storage device 630 may be capable of providing mass storage for the system 600. In some implementations, the storage device 630 may be a computer-readable medium. In alternate implementations, the storage device 630 may be a floppy disk device, a hard disk device, an optical disk device, a tape device, non-volatile solid state memory, or any other type of storage device. The input/output device 640 may be configured to provide input/output operations for the system 600. In some implementations, the input/output device 640 may include a keyboard and/or pointing device. In alternate implementations, the input/output device 640 may include a display unit for displaying graphical user interfaces.

Figure 4:
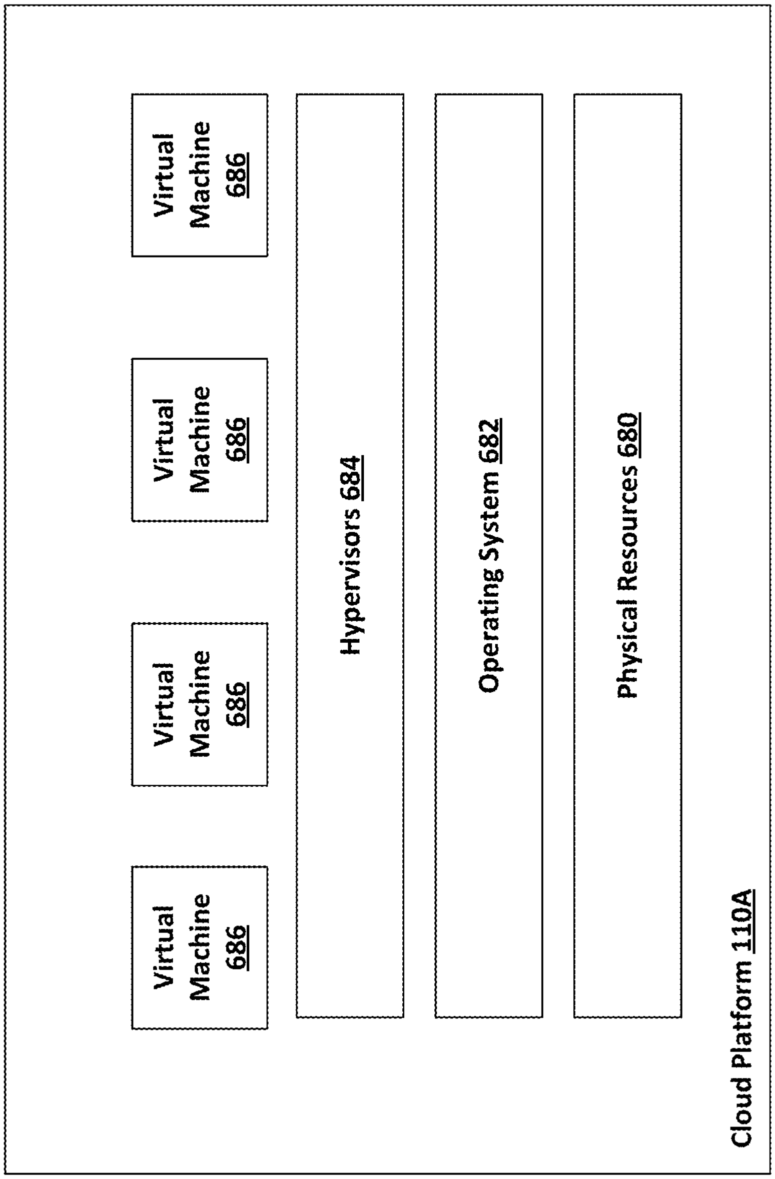
FIG. 4 depicts another example of a system, in accordance with some example implementations of the current subject matter.

FIG. 4 depicts an example implementation of the cloud platform, which provided the cloud services. The cloud platform may provide one or more of the cloud platforms 110A-C, and may include physical resources 680, such as at least one hardware servers, at least one storage, at least one memory, at least one network interface, and the like. The cloud server may also include infrastructure, as noted above, which may include at least one operating system 682 for the physical resources and at least one hypervisor 684 (which may create and run at least one virtual machine 686). For example, the application 112A may be run on a corresponding virtual machine.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A computer-implemented method, comprising:

searching, by a cross port assistant, a repository to identify one or more corrective measures for a first application hosted on a first cloud platform;

receiving, by the cross port assistant, a listing of the one or more corrective measures that have been implemented for the first application hosted on the first cloud platform;

receiving, by the cross port assistant, an indication of a selection of a corrective measure from the listing of the one or more corrective measures that have been implemented for the first application hosted on the first cloud platform;

analyzing, by the cross port assistant, upgrade code for the selected corrective measure to determine an extent of the upgrade code;

comparing, by the cross port assistant, a first code for the first application and a second code for a second application that is hosted on a second cloud platform and that is a target of the upgrade code to determine a degree of similarity; and in response to the degree of similarity being within a threshold amount, the method further comprises:

porting the upgrade code to the second application hosted on the second cloud platform, triggering additional testing of the first application and the second application, and allowing the upgrade code at the second application to be released for productive use at the second cloud platform.

Example 2: The computer-implemented method of Example 1, wherein the searching further comprises the cross port assistant searching a plurality of repositories based on an identifier of the first application for the one or more corrective measures.

Example 3: The computer-implemented method of any of Examples 1-2, wherein the first cloud platform comprises a public cloud, and wherein the second cloud platform comprises a private cloud platform.

Example 4: The computer-implemented method of any of Examples 1-3, wherein the listing is received from the repository.

Example 5: The computer-implemented method of any of Examples 1-4, wherein the indication of the selected corrective measure is received from a user interface at a client device.

Example 6: The computer-implemented method of any of Examples 1-5, wherein the receiving the indication of the selected corrective measure further comprises opening the selected corrective measure to reveal one or more coding changes.

Example 7: The computer-implemented method of any of Examples 1-6, wherein the analyzing further comprises analyzing the upgrade code to determine an extent of change.

Example 8: The computer-implemented method of any of Examples 1-7, wherein in response to the degree of similarity not being within the threshold amount, triggering an alert message.

Example 9: A system comprising:

at least one processor; and at least one memory including program code which when executed by the at least one memory causes operations comprising:

searching, by a cross port assistant, a repository to identify one or more corrective measures for a first application hosted on a first cloud platform;

receiving, by the cross port assistant, a listing of the one or more corrective measures that have been implemented for the first application hosted on the first cloud platform;

receiving, by the cross port assistant, an indication of a selection of a corrective measure from the listing of the one or more corrective measures that have been implemented for the first application hosted on the first cloud platform;

analyzing, by the cross port assistant, upgrade code for the selected corrective measure to determine an extent of the upgrade code;

comparing, by the cross port assistant, a first code for the first application and a second code for a second application that is hosted on a second cloud platform and that is a target of the upgrade code to determine a degree of similarity; and in response to the degree of similarity being within a threshold amount, the method further comprises:

porting the upgrade code to the second application hosted on the second cloud platform, triggering additional testing of the first application and the second application, and allowing the upgrade code at the second application to be released for productive use at the second cloud platform.

Example 10: The system of any of Example 9, wherein the searching further comprises the cross port assistant searching a plurality of repositories based on an identifier of the first application for the one or more corrective measures.

Example 11: The system of any of Examples 9-10, wherein the first cloud platform comprises a public cloud, and wherein the second cloud platform comprises a private cloud platform.

Example 12: The system of any of Examples 9-11, wherein the listing is received from the repository.

Example 13: The system of any of Examples 9-12, wherein the indication of the selected corrective measure is received from a user interface at a client device.

Example 14: The system of any of Examples 9-13, wherein the receiving the indication of the selected corrective measure further comprises opening the selected corrective measure to reveal one or more coding changes.

Example 15: The system of any of Examples 9-14, wherein the analyzing further comprises analyzing the upgrade code to determine an extent of change.

Example 16: The system of any of Examples 9-15, wherein in response to the degree of similarity not being within the threshold amount, triggering an alert message.

Example 17: A non-transitory computer readable storage medium including program code which when executed by at least one memory causes operations comprising:

searching, by a cross port assistant, a repository to identify one or more corrective measures for a first application hosted on a first cloud platform;

receiving, by the cross port assistant, a listing of the one or more corrective measures that have been implemented for the first application hosted on the first cloud platform;

receiving, by the cross port assistant, an indication of a selection of a corrective measure from the listing of the one or more corrective measures that have been implemented for the first application hosted on the first cloud platform;

analyzing, by the cross port assistant, upgrade code for the selected corrective measure to determine an extent of the upgrade code;

comparing, by the cross port assistant, a first code for the first application and a second code for a second application that is hosted on a second cloud platform and that is a target of the upgrade code to determine a degree of similarity; and in response to the degree of similarity being within a threshold amount, the method further comprises:

porting the upgrade code to the second application hosted on the second cloud platform, triggering additional testing of the first application and the second application, and allowing the upgrade code at the second application to be released for productive use at the second cloud platform.

Example 18: The non-transitory computer readable storage medium of Example 17, wherein the searching further comprises the cross port assistant searching a plurality of repositories based on an identifier of the first application for the one or more corrective measures.

Example 19: The non-transitory computer readable storage medium of any of Examples 17-18, wherein the first cloud platform comprises a public cloud, and wherein the second cloud platform comprises a private cloud platform.

Example 20: The non-transitory computer readable storage medium of any of Examples 17-19, wherein the listing is received from the repository.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second and the like can, in some situations, relate to an order; as used in a document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:

searching, by a cross port assistant, a repository to identify one or more corrective measures for a first application hosted on a first cloud platform;

receiving, by the cross port assistant, a listing of the one or more corrective measures that have been implemented for the first application hosted on the first cloud platform;

receiving, by the cross port assistant, an indication of a selection of a corrective measure from the listing of the one or more corrective measures that have been implemented for the first application hosted on the first cloud platform;

analyzing, by the cross port assistant, upgrade code for the selected corrective measure to determine an extent of the upgrade code;

comparing, by the cross port assistant, a first code for the first application and a second code for a second application that is hosted on a second cloud platform and that is a target of the upgrade code to determine a degree of similarity; and in response to the degree of similarity being within a threshold amount, the method further comprises:

porting the upgrade code to the second application hosted on the second cloud platform, triggering additional testing of the first application and the second application, and allowing the upgrade code at the second application to be released for productive use at the second cloud platform.

2. The computer-implemented method of claim 1, wherein the searching further comprises the cross port assistant searching a plurality of repositories based on an identifier of the first application for the one or more corrective measures.

3. The computer-implemented method of claim 1, wherein the first cloud platform comprises a public cloud, and wherein the second cloud platform comprises a private cloud platform.

4. The computer-implemented method of claim 1, wherein the listing is received from the repository.

5. The computer-implemented method of claim 1, wherein the indication of the selected corrective measure is received from a user interface at a client device.

6. The computer-implemented method of claim 1, wherein the receiving the indication of the selected corrective measure further comprises opening the selected corrective measure to reveal one or more coding changes.

7. The computer-implemented method of claim 1, wherein the analyzing further comprises analyzing the upgrade code to determine an extent of change.

8. The computer-implemented method of claim 1, wherein in response to the degree of similarity not being within the threshold amount, triggering an alert message.

9. A system comprising:

at least one processor; and at least one memory including program code which when executed by the at least one memory causes operations comprising:

searching, by a cross port assistant, a repository to identify one or more corrective measures for a first application hosted on a first cloud platform;

receiving, by the cross port assistant, a listing of the one or more corrective measures that have been implemented for the first application hosted on the first cloud platform;

receiving, by the cross port assistant, an indication of a selection of a corrective measure from the listing of the one or more corrective measures that have been implemented for the first application hosted on the first cloud platform;

analyzing, by the cross port assistant, upgrade code for the selected corrective measure to determine an extent of the upgrade code;

comparing, by the cross port assistant, a first code for the first application and a second code for a second application that is hosted on a second cloud platform and that is a target of the upgrade code to determine a degree of similarity; and in response to the degree of similarity being within a threshold amount, the operations further comprises:

porting the upgrade code to the second application hosted on the second cloud platform, triggering additional testing of the first application and the second application, and allowing the upgrade code at the second application to be released for productive use at the second cloud platform.

10. The system of claim 9, wherein the searching further comprises the cross port assistant searching a plurality of repositories based on an identifier of the first application for the one or more corrective measures.

11. The system of claim 9, wherein the first cloud platform comprises a public cloud, and wherein the second cloud platform comprises a private cloud platform.

12. The system of claim 9, wherein the listing is received from the repository.

13. The system of claim 9, wherein the indication of the selected corrective measure is received from a user interface at a client device.

14. The system of claim 9, wherein the receiving the indication of the selected corrective measure further comprises opening the selected corrective measure to reveal one or more coding changes.

15. The system of claim 9, wherein the analyzing further comprises analyzing the upgrade code to determine an extent of change.

16. The system of claim 9, wherein in response to the degree of similarity not being within the threshold amount, triggering an alert message.

17. A non-transitory computer readable storage medium including program code which when executed by at least one memory causes operations comprising:

searching, by a cross port assistant, a repository to identify one or more corrective measures for a first application hosted on a first cloud platform;

receiving, by the cross port assistant, a listing of the one or more corrective measures that have been implemented for the first application hosted on the first cloud platform;

receiving, by the cross port assistant, an indication of a selection of a corrective measure from the listing of the one or more corrective measures that have been implemented for the first application hosted on the first cloud platform;

analyzing, by the cross port assistant, upgrade code for the selected corrective measure to determine an extent of the upgrade code;

comparing, by the cross port assistant, a first code for the first application and a second code for a second application that is hosted on a second cloud platform and that is a target of the upgrade code to determine a degree of similarity; and in response to the degree of similarity being within a threshold amount, the operations further comprises:

porting the upgrade code to the second application hosted on the second cloud platform, triggering additional testing of the first application and the second application, and allowing the upgrade code at the second application to be released for productive use at the second cloud platform.

18. The non-transitory computer readable storage medium of claim 17, wherein the searching further comprises the cross port assistant searching a plurality of repositories based on an identifier of the first application for the one or more corrective measures.

19. The non-transitory computer readable storage medium of claim 17, wherein the first cloud platform comprises a public cloud, and wherein the second cloud platform comprises a private cloud platform.

20. The non-transitory computer readable storage medium of claim 17, wherein the listing is received from the repository.

* * * * *